US012654149B2

(12) United States Patent (10) Patent No.: US 12,654,149 B2
Suzue et al. (45) Date of Patent: Jun. 16, 2026

(54) GIS-TYPE ZEOLITE FORMED BODY, ADSORPTION APPARATUS, SEPARATION METHOD, AND GIS-TYPE ZEOLITE

(71) Applicant: ASAHI KASEI KABUSHIKI KAISHA, Tokyo (JP)

(72) Inventors: Yuji Suzue, Tokyo (JP); Kouji Nomura, Tokyo (JP); Takayuki Akaogi, Tokyo (JP); Takehiro Iitsuka, Tokyo (JP)

(73) Assignee: ASAHI KASEI KABUSHIKI KAISHA, Osaka (JP)

( * ) Notice: Subject to any disclaimer, the term of this patent is extended or adjusted under 35 U.S.C. 154(b) by 323 days.

(21) Appl. No.: 18/287,611

(22) PCT Filed: May 26, 2022

(86) PCT No.: PCT/JP2022/021580
§ 371 (c)(1),
(2) Date: Oct. 19, 2023

(87) PCT Pub. No.: WO2022/259880
PCT Pub. Date: Dec. 15, 2022

(65) Prior Publication Data
US 2024/0216888 A1 Jul. 4, 2024

(30) Foreign Application Priority Data
Jun. 7, 2021 (JP) ................................. 2021-095003

(51) Int. Cl.
*C01B 39/46* (2006.01)
*B01D 53/04* (2006.01)
(Continued)

(52) U.S. Cl.
CPC ........ *B01J 20/186* (2013.01); *B01D 53/0462* (2013.01); *B01D 53/047* (2013.01); (Continued)

(58) Field of Classification Search
CPC ................ B01J 20/186; B01J 20/28004; B01J 20/28011; B01J 20/28016; B01J 20/3007; (Continued)

(56) References Cited

U.S. PATENT DOCUMENTS 8,815,190 B2 8/2014 Dotzel et al.
9,707,539 B2 7/2017 Bats et al.
(Continued)

FOREIGN PATENT DOCUMENTS

CN 105358483 A 2/2016
CN 108025920 A 5/2018
(Continued)

OTHER PUBLICATIONS

Machine-generated English translation of JP 2006-281068 A, published Oct. 19, 2006.*
(Continued)

*Primary Examiner* — Frank M Lawrence, Jr.
(74) *Attorney, Agent, or Firm* — Birch, Stewart, Kolasch & Birch, LLP

(57) ABSTRACT

A GIS-type zeolite formed body including a GIS-type zeolite and a carrier, in which, when a total amount of substance of potassium and lithium is defined as A and a total amount of substance of an alkali metal is defined as C, $C/A \leq 1.30$ is satisfied.

19 Claims, 1 Drawing Sheet

(51) Int. Cl.

| | |
|---|---|
| *B01D 53/047* | (2006.01) |
| *B01J 20/18* | (2006.01) |
| *B01J 20/28* | (2006.01) |
| *B01J 20/30* | (2006.01) |

(52) U.S. Cl.

CPC ... *B01J 20/28004* (2013.01); *B01J 20/28011* (2013.01); *B01J 20/28016* (2013.01); *B01J 20/3007* (2013.01); *B01J 20/3078* (2013.01); *B01J 20/3085* (2013.01); *C01B 39/46* (2013.01); *B01D 2253/108* (2013.01); *B01D 2257/102* (2013.01); *B01D 2257/504* (2013.01); *B01D 2257/7025* (2013.01)

(58) Field of Classification Search

CPC .......................... B01J 20/3078; B01J 20/3085; B01J 20/2803; B01J 20/08; B01J 20/28; B01J 20/30; B01J 20/18; B01D 53/0462; B01D 53/04; B01D 53/047; B01D 2253/108; B01D 2257/102; B01D 2257/504; B01D 2257/7025; B01D 53/02; B01D 2256/10; B01D 2256/16; B01D 2256/20; B01D 2256/24; B01D 2257/11; B01D 2257/2025; B01D 2257/2045; B01D 2257/406; B01D 2257/80; C01B 39/46; Y02C 20/40

USPC ...... 96/108; 95/96, 117, 127, 128, 131, 132, 95/139; 502/400

See application file for complete search history.

(56) References Cited

U.S. PATENT DOCUMENTS

| | | | |
|---|---|---|---|
| 10,646,847 | B2 | 5/2020 | Akaogi |
| 10,829,383 | B2 | 11/2020 | Akaogi |

| | | | |
|---|---|---|---|
| 2012/0227584 | A1 | 9/2012 | Wang et al. |
| 2016/0007640 | A1 | 1/2016 | Zavrel et al. |
| 2016/0115039 | A1 | 4/2016 | Okubo et al. |
| 2018/0280924 | A1 | 10/2018 | Maeda et al. |
| 2019/0351399 | A1 | 11/2019 | Sree et al. |
| 2020/0223706 | A1 | 7/2020 | Akaogi |

FOREIGN PATENT DOCUMENTS

| | | |
|---|---|---|
| CN | 109963811 A | 7/2019 |
| EP | 0 458 414 A2 | 11/1991 |
| EP | 3 388 392 A1 | 10/2018 |
| JP | 61-155216 A | 7/1986 |
| JP | 4-228418 A | 8/1992 |
| JP | 2006-281068 A | 10/2006 |
| JP | 2013-139365 A | 7/2013 |
| JP | 2020-14978 A | 1/2020 |
| JP | 6714789 B2 | 6/2020 |
| KR | 10-2021-0061509 A | 5/2021 |
| WO | WO 2019/202933 A1 | 10/2019 |

OTHER PUBLICATIONS

Machine-generated English translation of KO 20210061509 A, published May 28, 2021.*

European Search Report for European Application No. 22820062.2, dated Sep. 24, 2024.

Choi et al., "Framework flexibility-driven CO2 adsorption on a zeolite," Materials Horizon, vol. 7, 2020, pp. 1528-1532.

International Preliminary Report on Patentability and Written Opinion of the International Searching Authority for International Application No. PCT/JP2022/021580, dated Dec. 21, 2023, with an English translation.

International Search Report for International Application No. PCT/JP2022/021580, dated Aug. 16, 2022, with English translation.

* cited by examiner

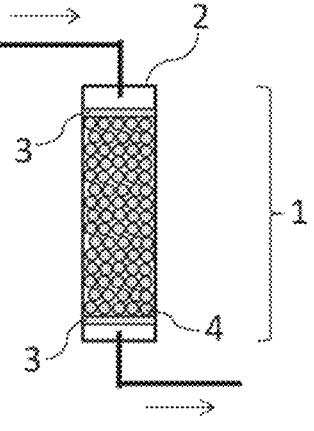

GIS-TYPE ZEOLITE FORMED BODY, ADSORPTION APPARATUS, SEPARATION METHOD, AND GIS-TYPE ZEOLITE

TECHNICAL FIELD

The present invention relates to a GIS-type zeolite formed body, an adsorption apparatus, a separation method, and a GIS-type zeolite.

BACKGROUND ART

Zeolite can be used for adsorbing materials, desiccants, separating agents, catalysts, catalyst carriers, detergent aids, ion exchangers, waste water treatment agents, fertilizers, food additives, cosmetic additives and the like, and, in particular, is useful in gas separation applications. These can also be subjected to metal interchange depending on applications, and then used.

For example, Patent Literature 1 describes a GIS-type zeolite where the diffraction angle $2\theta$ of a specific diffraction peak is within a predetermined range, as a zeolite suitably used in various applications. Such a GIS-type zeolite here has a GIS structure in codes for directing zeolite structures specified by the International Zeolite Association (IZA). Patent Literature 1 also describes the amount of potassium that can be included in the GIS-type zeolite.

CITATION LIST

Patent Literature

Patent Literature 1: Japanese Patent No. 6714789

SUMMARY OF INVENTION

Technical Problem

In a case where the GIS-type zeolite described in Patent Literature 1 is used for, for example, catalysts, adsorbing materials, and the like, there is room for improvement from the viewpoint of a more enhancement in strength in view of actual transport, transfer, and use.

The present invention has been made in view of the above problems, and an object thereof is to provide a GIS-type zeolite formed body higher in strength.

Solution to Problem

The present inventors have found that the ratio between the total amount of substance of an alkali metal and the total amount of substance of potassium and lithium is within a predetermined range in a GIS-type zeolite formed body to thereby allow the obtained formed body to be enhanced in strength, leading to completion of the present invention.

That is, the present invention encompasses the following aspects.

<1>
A GIS-type zeolite formed body, including
a GIS-type zeolite, and
a carrier,
wherein, when a total amount of substance of potassium and lithium is defined as A and a total amount of substance of an alkali metal is defined as C, C/A≤1.30 is satisfied.

<2>
The GIS-type zeolite formed body according to <1>, wherein, when a total amount of substance of potassium and lithium is defined as A, and a sum of respective products by multiplication of amounts of substance with valences of an alkali metal and an alkaline earth metal is defined as B, B/A≤1.30 is satisfied.

<3>
The GIS-type zeolite formed body according to <1> or <2>, wherein, when a total amount of substance of potassium is defined as D and a total amount of substance of an alkali metal is defined as C, C/D≤1.30 is satisfied.

<4>
The GIS-type zeolite formed body according to any of <1> to <3>, wherein 1.00<C/A is satisfied.

<5>
The GIS-type zeolite formed body according to any of <1> to <4>, wherein 1.00<B/A is satisfied.

<6>
The GIS-type zeolite formed body according to any of <1> to <4>, wherein 1.00<C/D is satisfied.

<7>
The GIS-type zeolite formed body according to any of <1> to <6>, wherein the carrier includes one or more selected from the group consisting of silica and alumina.

<8>
The GIS-type zeolite formed body according to any of <1> to <7>, wherein the GIS-type zeolite formed body has a particle size of 20 μm or more and 300 μm or less.

<9>
The GIS-type zeolite formed body according to <8>, wherein the GIS-type zeolite formed body is obtained through spray-drying treatment.

<10>
The GIS-type zeolite formed body according to <8> or <9>, wherein the GIS-type zeolite formed body has a compressive strength of 6.0 MPa or more.

<11>
The GIS-type zeolite formed body according to any of <1> to <10>, wherein the GIS-type zeolite formed body is a pellet having a length of 3 mm or more and 50 mm or less and a diameter of 1 mm or more and 20 mm or less.

<12>
The GIS-type zeolite formed body according to <11>, wherein the GIS-type zeolite formed body is obtained through extrusion treatment.

<13>
The GIS-type zeolite formed body according to <11> or <12>, wherein the GIS-type zeolite formed body has a fracture strength of 20 N or more.

<14>
An adsorption apparatus including the GIS-type zeolite formed body according to any of <1> to <13>.

<15>
A separation method including separating one or more selected from the group consisting of $CO_2$, $H_2O$, He, Ne, $Cl_2$, $NH_3$, and HCl from a mixture including two or more gases selected from the group consisting of $H_2$, $N_2$, CO, and hydrocarbon by use of the adsorption apparatus according to <14>.

<16>
The separation method according to <15>, wherein the gas separation is performed by a pressure swing-type adsorption-separation method, a temperature swing-type adsorption-separation method, or a pressure/temperature swing-type adsorption-separation method.

<17>

A method for producing a purified gas, including separating one or more selected from the group consisting of $CO_2$, $H_2O$, He, Ne, $Cl_2$, $NH_3$, and HCl from a mixture including two or more gases selected from the group consisting of $H_2$, $N_2$, CO, and hydrocarbon by use of the adsorption apparatus according to <14>.

<18>

A GIS-type zeolite, wherein, when a total amount of substance of potassium is defined as A and a total amount of substance of an alkali metal is defined as C, C/A≤1.30 is satisfied.

Advantageous Effect of Invention

The present invention can provide a GIS-type zeolite formed body higher in strength.

BRIEF DESCRIPTION OF DRAWING

FIG. 1 is a view exemplifying an adsorption apparatus according to one embodiment of the present invention.

DESCRIPTION OF EMBODIMENTS

Hereinafter, an embodiment for carrying out the present invention (hereinafter, also referred to as "the present embodiment".) will be described in detail. The present invention is not limited to the following present embodiment, and can be variously modified and carried out within the gist thereof.

[GIS-Type Zeolite Formed Body]

A GIS-type zeolite formed body of the present embodiment includes a GIS-type zeolite and a carrier, wherein, when the total amount of substance of potassium and lithium is defined as A and the total amount of substance of an alkali metal is defined as C, C/A≤1.30 is satisfied. The GIS-type zeolite formed body of the present embodiment is thus configured, and thus is excellent in strength.

The GIS-type zeolite formed body of the present embodiment satisfies B/A≤1.30 when the total amount of substance of potassium and lithium is defined as A, and the sum of respective products by multiplication of the amounts of substance with the valences of an alkali metal and an alkaline earth metal is defined as B. The GIS-type zeolite formed body of the present embodiment is thus configured, and thus is excellent in strength.

The present inventors have repeated trial and error at the outset of the initiation of studies about the composition of a GIS-type zeolite formed body, from the following viewpoint. That is, the inventors have initiated studies on the assumption that an alkali metal promotes dehydration condensation of silica, alumina or the like often used as a formed carrier and strength of a formed body thus exhibited is affected by the order of electronegativity.

However, the present inventors have made repeated studies, and as a result, it has been surprisingly confirmed that a GIS-type zeolite formed body may be more excellent in strength in the case of having a composition having lithium and potassium as cations, than the case of having a composition having, as a cation, only sodium whose electronegativity is located between those of lithium and potassium.

The present inventors have analyzed such a case example, and as a result, have led to find a tendency that a GIS-type zeolite formed body is enhanced in strength when the total amount of substance C of an alkali metal is equal to or less than a certain amount relative to the amounts of substance of potassium and lithium.

Although the detailed mechanism is not necessarily clear, it is presumed by the present inventors that at least one of potassium and lithium is included in a cation of a GIS-type zeolite and the amount of substance thereof is set to a certain amount or more to result in the changes in wettability, solvent affinity, surface potential, and the like of the zeolite itself and then have an influence on strength of a formed body.

A zeolite formed body can be enhanced in strength to thereby inhibit the formed body from being damaged due to transport or transfer. For example, in the case of a fluid bed apparatus, a zeolite formed body can be enhanced in strength to thereby allow the formed body to be hardly damaged even by an increase in linear speed of gas, resulting in an increase in amount of gas fed, and thus the throughput per time is easily increased and an enhancement in economic performance is expected.

C/A described above, in the GIS-type zeolite formed body, is preferably 1.25 or less, more preferably 1.20 or less, further preferably 1.15 or less from the viewpoint of a more enhancement in strength of the GIS-type zeolite formed body. The lower limit value of C/A is not particularly limited, and is, for example, more than 1.00 (namely, 1.00<C/A is satisfied).

B/A described above, in the GIS-type zeolite formed body, is preferably 1.25 or less, more preferably 1.20 or less, further preferably 1.15 or less from the viewpoint of a more enhancement in strength of the GIS-type zeolite formed body. The lower limit value of B/A is not particularly limited, and is, for example, more than 1.00 (namely, 1.00<B/A is satisfied).

When the total amount of substance of potassium is defined as D and the total amount of substance of an alkali metal is defined as C in the GIS-type zeolite formed body, C/D is preferably 1.30 or less, more preferably 1.25 or less, further preferably 1.20 or less, still further preferably 1.15 or less from the viewpoint of a more enhancement in strength of the GIS-type zeolite formed body. The lower limit value of C/D is not particularly limited, and is, for example, more than 1.00 (namely, 1.00<C/D is satisfied).

The values of A, B, C and D in the present embodiment can be measured by a method described in Examples below. The values of A, B, C and D can be controlled so as to satisfy a desired relationship, by, for example, selection of the type of a metal in cation exchange treatment during synthesis of a GIS-type zeolite, appropriate adjustment of conditions of the ion concentration, the number of treatment times, and the like, or selection of the type of a carrier used and the amount of the carrier.

(GIS-Type Zeolite)

The GIS-type zeolite formed body of the present embodiment includes a GIS-type zeolite as a zeolite from the viewpoint that a desired function is exhibited. The GIS-type zeolite in the present embodiment preferably exhibits diffraction peaks of (1 0 1) and (3 1 2) around 2θ=12.45° and 33.36° in a spectrum obtained by X-ray diffraction, as described in ICDD (International Centre for Diffraction Data) (for example, 00-039-0219) or the like. A diffraction peak of (1 0 1) is typically observed in the range of 2θ=12.15° to 12.75°, and a diffraction peak of (3 1 2) is typically observed in the range of 33.15° to 33.65°. In addition, a diffraction peak of (2 1 1) is typically observed in the range of 2θ=20.1° to 24.1°.

Furthermore, it is known with respect to the GIS-type zeolite that shifting to a high angle in a spectrum obtained by X-ray diffraction is observed due to cation exchange with potassium or lithium. For example, a diffraction peak of (1 0 1) may also be observed in the range of $2\theta=12.55°$ to $12.90°$, or a diffraction peak of (3 1 2) may also be observed in the range of $33.70°$ to $34.25°$. The $2\theta$ value of a diffraction peak of (3 1 2) is more preferably $2\theta=33.85°$ to $34.22°$, further preferably $2\theta=34.02°$ to $34.20°$. A diffraction peak of (3 1 2) may also be present at any value other than the $2\theta$ value. A $2\theta$ value other than the above is, for example, $2\theta=21.22$ to $22.17°$, $22.18$ to $22.38°$, $28.34$ to $28.74°$, $28.86$ to $29.26°$, $31.30$ to $31.70°$, or $38.40$ to $38.80°$.

When the total amount of substance of potassium and lithium is defined as A and the total amount of substance of an alkali metal is defined as C in the GIS-type zeolite, C/A is preferably 1.30 or less, more preferably 1.25 or less, further preferably 1.20 or less, still further preferably 1.15 or less, from the viewpoint of a more enhancement in strength of the GIS-type zeolite formed body. The lower limit value of C/A is not particularly limited, and is, for example, more than 1.00 (namely, $1.00<C/A$ is satisfied).

When the total amount of substance of potassium and lithium is defined as A, and the sum of respective products by multiplication of the amounts of substance with the valences of an alkali metal and an alkaline earth metal is defined as B in the GIS-type zeolite, B/A is preferably 1.30 or less, more preferably 1.25 or less, further preferably 1.20 or less, still further preferably 1.15 or less from the viewpoint of a more enhancement in strength of the GIS-type zeolite formed body. The lower limit value of B/A is not particularly limited, and is, for example, more than 1.00 (namely, $1.00<B/A$ is satisfied).

When the total amount of substance of potassium is defined as D and the total amount of substance of an alkali metal is defined as C in the GIS-type zeolite, C/D is preferably 1.30 or less, more preferably 1.25 or less, further preferably 1.20 or less, still further preferably 1.15 or less from the viewpoint of a more enhancement in strength of the GIS-type zeolite formed body. The lower limit value of C/D is not particularly limited, and is, for example, more than 1.00 (namely, $1.00<C/D$ is satisfied).

The GIS-type zeolite in the present embodiment is preferably silica/alumina from the viewpoint of allowing the selective adsorption ability of carbon dioxide to be more enhanced.

The "silica/alumina" here refers to a GIS-type zeolite including silica and alumina as main components of the GIS-type zeolite (80% by mass or more), in which the content of aluminum is 1% by mass or more, more preferably 3% by mass or more, further preferably 5% by mass or more, the content of phosphorus is 4% by mass or less, and the contents of Zr and Ti are 8% by mass or less.

From the same viewpoint as described above, the aluminum content in the GIS-type zeolite of the present embodiment is preferably 20% by mass or less, more preferably 19% by mass or less.

From the same viewpoint as described above, the phosphorus atom content in the GIS-type zeolite of the present embodiment is more preferably 1.5% by mass or less, particularly preferably 0% by mass.

The aluminum and phosphorus atom contents can be measured by a method described in Examples below. In addition, the aluminum and phosphorus atom contents can be adjusted by, for example, adjusting the compositional ratio of a mixed-gel for use in synthesis of the GIS-type zeolite within a preferable range described below.

(Cation)

The GIS-type zeolite in the present embodiment includes at least one of Li and K, preferably includes K. Examples of other alkali metal and alkaline earth metal which can be included in the GIS-type zeolite in the present embodiment include Na, Rb, Cs, Ca, Mg, Sr, and Ba, and Na, Rb, Cs, or Ca is preferable and Na is more preferable from the viewpoint of more facilitating crystal formation of the GIS-type backbone.

The content of the GIS-type zeolite is preferably 10 to 95% by mass, more preferably 20 to 92% by mass, further preferably 30 to 90% by mass based on 100% by mass of the GIS-type zeolite formed body.

(Method for Producing GIS-Type Zeolite)

A method for producing the GIS-type zeolite in the present embodiment can include, for example, a step of preparing of a mixed gel containing a silica source including silicon, an aluminum source including aluminum, an alkali metal source including at least one selected from an alkali metal (M1) and an alkaline earth metal (M2), a phosphorus source including phosphorus, and water. Hereinafter, the mixed gel and each component included therein will be described.

(Mixed Gel)

The mixed gel in the present embodiment is a mixture including a silica source, an aluminum source, an alkali metal source and water as components and, if necessary, including a phosphorus source and an organic structure-directing agent.

The silica source refers to a component in the mixed gel, serving as a starting material of silicon included in a zeolite produced from the mixed gel, the aluminum source refers to a component in the mixed gel, serving as a starting material of aluminum included in a zeolite produced from the mixed gel, the alkali metal source refers to a component in the mixed gel, serving as starting material (s) of an alkali metal and/or an alkaline earth metal included in a zeolite produced from the mixed gel, and the phosphorus source refers to a component in the mixed gel, serving as a starting material of phosphorus included in a zeolite produced from the mixed gel.

(Silica Source)

The silica source is not particularly limited as long as it is one commonly used, and specific examples thereof include sodium silicate, amorphous silica, colloidal silica, wet method silica, dry method silica, silica gel, amorphous aluminosilicate gel, tetraethoxysilane (TEOS) and trimethylethoxysilane. These compounds may be used singly or in combinations of a plurality thereof. Here, amorphous aluminosilicate gel serves as the silica source and also serves as the aluminum source.

Among them, sodium silicate is preferable from the viewpoint that a zeolite high in the degree of crystallinity tends to be obtained.

(Aluminum Source)

The aluminum source is not particularly limited as long as it is one commonly used, and specific examples thereof include, sodium aluminate, aluminum sulfate, aluminum nitrate, aluminum acetate, aluminum hydroxide, aluminum oxide, aluminum chloride, aluminum alkoxide, metallic aluminum and amorphous aluminosilicate gel. These compounds may be used singly or in combinations of a plurality thereof.

Among them, sodium aluminate, aluminum sulfate, aluminum nitrate, aluminum acetate, aluminum hydroxide, aluminum chloride or aluminum alkoxide is preferable from the viewpoint that a zeolite high in the degree of crystallinity tends to be obtained. From the same viewpoint, sodium aluminate or aluminum hydroxide is more preferable, and sodium aluminate is further preferable.

(Alkali Metal Source)

The alkali type in the alkali metal source is not particularly limited, and any alkali metal and/or any alkaline earth metal compound can be used.

Examples of the alkali metal source include, but not limited to the following, hydroxide, hydrogen carbonate, carbonate, acetate, sulfate and nitrate of an alkali metal or an alkaline earth metal. These compounds may be used singly or in combinations of a plurality thereof.

The alkali metal and the alkaline earth metal for use in the alkali metal source can be usually Li, Na, K, Rb, Cs, Ca, Mg, Sr, Ba or the like. Li, Na, K, Rb, Cs or Ca is preferable and Na, Li or K is more preferable from the viewpoint of more facilitating crystal formation of the GIS-type backbone. The alkali metal and the alkaline earth metal for use in the alkali metal source may be used singly or in combinations of a plurality thereof.

Specific examples of the alkali metal source include, but not limited to the following, sodium hydroxide, sodium acetate, sodium sulfate, sodium nitrate, sodium carbonate, sodium hydrogen carbonate, potassium hydroxide, potassium acetate, potassium sulfate, potassium nitrate, potassium carbonate, potassium hydrogen carbonate, lithium hydroxide, lithium acetate, lithium sulfate, lithium nitrate, lithium carbonate, lithium hydrogen carbonate, rubidium hydroxide, rubidium acetate, rubidium sulfate, rubidium nitrate, rubidium carbonate, rubidium hydrogen carbonate, cesium hydroxide, cesium acetate, cesium sulfate, cesium nitrate, cesium carbonate, cesium hydrogen carbonate, calcium hydroxide, calcium acetate, calcium sulfate, calcium nitrate, calcium carbonate, calcium hydrogen carbonate, magnesium hydroxide, magnesium acetate, magnesium sulfate, magnesium nitrate, magnesium carbonate, magnesium hydrogen carbonate, strontium hydroxide, strontium acetate, strontium sulfate, strontium nitrate, strontium carbonate, strontium hydrogen carbonate, barium hydroxide, barium acetate, barium sulfate, barium nitrate, barium carbonate and barium hydrogen carbonate.

Among them, sodium hydroxide, potassium hydroxide, potassium carbonate, lithium hydroxide, lithium nitrate, rubidium hydroxide, cesium hydroxide, calcium hydroxide, magnesium hydroxide, strontium hydroxide or barium hydroxide is preferable, sodium hydroxide, potassium hydroxide, potassium carbonate, lithium hydroxide, lithium nitrate, rubidium hydroxide or cesium hydroxide is more preferable, and sodium hydroxide, potassium hydroxide, potassium carbonate or lithium nitrate is further preferable.

(Phosphorus Source)

The phosphorus source is not particularly limited as long as it is one commonly used, and specific examples thereof include an aqueous phosphoric acid solution, sodium phosphate, aluminum phosphate, potassium phosphate, lithium phosphate, calcium phosphate and barium phosphate. These compounds may be used singly or in combinations of a plurality thereof.

Among them, an aqueous phosphoric acid solution, sodium phosphate or aluminum phosphate is preferable. From the same viewpoint, an aqueous phosphoric acid solution or sodium phosphate is more preferable and an aqueous phosphoric acid solution is further preferable from the viewpoint that a zeolite high in the degree of crystallinity tends to be obtained.

(Organic Structure-Directing Agent)

The organic structure-directing agent in the case of zeolite production by hydrothermal synthesis of the mixed gel is a compound acting as promoting crystallization to a zeolite structure. In zeolite crystallization, the organic structure-directing agent can be, if necessary, used.

Any organic structure-directing agent may be adopted as the organic structure-directing agent without any limitation in terms of the type as long as it can form a desired GIS-type zeolite. The organic structure-directing agent may be used singly or in combinations of a plurality thereof.

As the organic structure-directing agent, without limitation to the following, for example, any of amines, quaternary ammonium salts, alcohols, ethers, amides, alkyl ureas, alkyl thioureas, cyanoalkanes, and alicyclic heterocyclic compounds including nitrogen as a hetero atom can be used, and alkylamines are preferably used and isopropylamine is more preferably used.

Such salts may have an anion. Representative examples of such an anion include, but not limited to the following, a halogen ion such as $Cl^-$, $Br^-$ and $I^-$, a hydroxide ion, an acetate ion, a sulfate ion, a nitrate ion, a carbonate ion, and a hydrogen carbonate ion. Among them, a halogen ion or a hydroxide ion is preferable and a halogen ion is more preferable from the viewpoint of more facilitating crystal formation of the GIS-type backbone.

(Compositional Ratio of Mixed-Gel)

The ratio between the silica source and the aluminum source in the mixed gel is represented as the molar ratio of the oxides of the corresponding elements, namely, $SiO_2/Al_2O_3$.

The ratio $SiO_2/Al_2O_3$ is not particularly limited as long as zeolite can be formed, and the ratio is preferably 4.0 or more and 70.0 or less, more preferably 4.4 or more and 65.0 or less, further preferably 5.5 or more and 55.0 or less, still further preferably 5.8 or more and 52.0 or less, furthermore preferably 6.0 or more and 50.0 or less, still furthermore preferably 6.5 or more and 40.0 or less because formation of a zeolite having a backbone different from the GIS-type backbone tends to be able to be suppressed.

The ratio between the aluminum source and the alkali metal source in the mixed gel is represented by the molar ratio of the sum of $M1_2O$ and $M2O$ to $Al_2O_3$, namely, $(M1_2O+M2O)/Al_2O_3$ (wherein M1 represents the alkali metal and M2 represents the alkaline earth metal). Herein, the ratio $(M1_2O+M2O)/Al_2O_3$ is further preferably 1.6 or more, still further preferably 1.7 or more, furthermore preferably 1.8 or more, still furthermore preferably 1.9 or more from the viewpoint of more facilitating crystal formation of the GIS-type backbone.

The ratio $(M1_2O+M2O)/Al_2O_3$ is preferably 2.5 or more and 75.0 or less, furthermore preferably 3.2 or more and 58.0 or less, still furthermore preferably 3.4 or more and 55.5 or less from the viewpoint that formation of a zeolite having a backbone different from the GIS-type backbone can be suppressed.

The ratio between the phosphorus source and the aluminum source in the mixed gel is represented as the molar ratio of the oxides of the corresponding elements, namely, $P_2O_5/Al_2O_3$.

The ratio $P_2O_5O_2/Al_2O_3$ is not particularly limited as long as zeolite can be formed, and the ratio is preferably less than 1.0, more preferably 0.6 or less, further preferably 0.4 or less, particularly preferably 0 because formation of a zeolite having a backbone different from the GIS-type backbone tends to be able to be suppressed.

When the organic structure-directing agent is included in the mixed gel, the ratio between the aluminum source and the organic structure-directing agent in the mixed gel is represented by the molar ratio of the organic structure-directing agent to $Al_2O_3$, namely, $R/Al_2O_3$ (wherein R represents the organic structure-directing agent). The ratio is preferably less than 9.5, more preferably 7.5 or less, further preferably 6.0 or less from the viewpoint of more facilitating crystal formation of the GIS-type backbone and/or decreasing the synthesis period to allow economic efficiency in zeolite production to be excellent.

The ratio between the aluminum source and water in the mixed gel is represented by the molar ratio of water to $Al_2O_3$, namely, $H_2O/Al_2O_3$. The ratio is preferably 100 or more, more preferably 200 or more from the viewpoint that the components in the mixed gel tend to be more uniformly dispersed. The ratio is further preferably 300 or more from the viewpoint that formation of a zeolite having a backbone different from the GIS-type backbone can be suppressed.

The ratio $H_2O/Al_2O_3$ is preferably 2800 or less, more preferably 1800 or less from the viewpoint of decreasing the synthesis period to allow economic efficiency in zeolite production to be excellent. The ratio is further preferably 1300 or less from the viewpoint that formation of a zeolite having a backbone different from the GIS-type backbone can be suppressed.

As described above, the method for producing a GIS-type zeolite according to the present embodiment includes a step of preparing of a mixed gel containing a silica source including silicon, an aluminum source including aluminum, an alkali metal source including at least one selected from an alkali metal (M1) and an alkaline earth metal (M2), a phosphorus source, and water, wherein, when the molar ratios of components in the mixed gel are calculated in terms of oxides of corresponding elements with respect to the silicon, the aluminum, the alkali metal (M1), the alkaline earth metal (M2) and the phosphorus source, the molar ratios $\alpha$, $\beta$, $\gamma$ and $\delta$ represented by the following expressions (1), (2), (3) and (4) preferably satisfy $4.5 \leq \alpha \leq 65.0$, $2.5 \leq \beta \leq 75.0$, $0 \leq \gamma < 1.0$ and $100 \leq \delta \leq 2800$. The GIS-type zeolite according to the present embodiment is particularly preferably one obtained by the method for producing a GIS-type zeolite according to the present embodiment.

$$\alpha = SiO_2/Al_2O_3 \tag{1}$$

$$\beta = (Ml_2O + M2O)/Al_2O_3 \tag{2}$$

$$\gamma = P_2O_5/Al_2O_3 \tag{3}$$

$$\delta = H_2O/Al_2O_3 \tag{4}$$

Furthermore, in the method for producing a GIS-type zeolite according to the present embodiment, preferably, the molar ratios $\alpha$, $\beta$, $\gamma$ and $\delta$ satisfy the above ranges, and when the mixed gel further includes an organic structure-directing agent R, the molar ratio $\varepsilon$ represented by the following expression (5) preferably satisfies $\varepsilon < 9.5$.

$$\varepsilon = R/Al_2O_3 \tag{5}$$

Although a seed crystal is not necessarily needed to be present in the mixed gel, a GIS-type zeolite produced in advance can also be added as a seed crystal to the mixed gel, to provide the GIS-type zeolite of the present embodiment.

(Step of Preparing Mixed Gel)

The step of preparing a mixed gel is not particularly limited, and may include, for example, a mixing step of mixing a silica source, an aluminum source, an alkali metal source, water, and, if necessary, an organic structure-directing agent at one time or at multiple stages, and an aging step of the mixture obtained in the mixing step.

The mixing step can mix components including the silica source, the aluminum source, the alkali metal source, water, and, if necessary, the organic structure-directing agent at one time or at multiple stages.

The order in mixing at multiple stages is not limited, and may be appropriately selected depending on conditions used. The mixing at multiple stages may be performed either with stirring or without stirring.

In stirring, a stirring method commonly used is adopted without any particular limitation, and specific examples include methods using blade stirring, vibration stirring, oscillation stirring, and centrifugation stirring, and the like.

The rotational speed in stirring is not particularly limited as long as it is a stirring speed commonly used, and is, for example, 1 rpm or more and less than 2000 rpm.

The temperature in the mixing step is not particularly limited as long as it is a temperature commonly used, and is, for example, −20° C. or more and less than 80° C.

The period for the mixing step is not particularly limited and can be appropriately selected depending on the temperature in the mixing step, and is, for example, more than 0 minutes and 1000 hours or less.

The aging step may be performed with either standing or stirring.

In stirring in the aging step, a stirring method commonly used is adopted without any particular limitation, and specific examples include methods using blade stirring, vibration stirring, oscillation stirring, and centrifugation stirring.

The rotational speed in stirring is not particularly limited as long as it is a stirring speed commonly used, and is, for example, 1 rpm or more and less than 2000 rpm. The temperature in the aging step is not particularly limited as long as it is a temperature commonly used, and is, for example, −20° C. or more and less than 80° C.

The period for the aging step is not particularly limited, can be appropriately selected depending on the temperature in the aging step, and is, for example, more than 0 minutes and 1000 hours or less.

It is considered in zeolite production that dissolution of starting materials and production and re-dissolution of a zeolite precursor occur in the mixing step and the aging step of starting materials. In order to form a large periodic structure including an 8-membered ring without the occurrence of defects and the like, it is preferable not to allow formation of a zeolite precursor to excessively progress. When formation of a zeolite precursor excessively progresses, it is preferable not to excessively age such a precursor because generation of an ANA-type zeolite having a more stable structure tends to be increased. On the other hand, starting materials are preferably sufficiently mixed to provide a uniform starting material gel. The total period for the mixing step and the aging step combined may be appropriately adjusted based on the composition of starting materials, and the like in order to obtain a zeolite having a proper structure, and is not particularly limited. The period is typically preferably 1 minute or more and less than 24 hours, more preferably 3 minutes or more and less than 23 hours, further preferably 10 minutes or more and 18 hours or less, still further preferably 15 minutes or more and 15 hours or less, furthermore preferably 31 minutes or more and 6 hours or less.

(Hydrothermal Synthesis Step)

The method for producing a GIS-type zeolite according to the present embodiment preferably further includes a hydrothermal synthesis step where the hydrothermal synthesis temperature is 80° C. to 145° C., and the hydrothermal synthesis temperature is more preferably 80° C. to 140° C. That is, the mixed gel obtained in the preparation step is preferably subjected to hydrothermal synthesis with being kept at a predetermined temperature for a predetermined period with stirring or standing.

The temperature in the hydrothermal synthesis is not particularly limited as long as it is a temperature commonly used, and it is preferably 80° C. or more from the viewpoint of decreasing the synthesis period to allow economic efficiency in zeolite production to be excellent. The temperature is more preferably 90° C. or more, further preferably 100° C. or more from the viewpoint that formation of a zeolite having a backbone different from the GIS-type backbone can be suppressed.

The temperature is more preferably 145° C. or less, further preferably 140° C. or less, further preferably 135° C. or less from the viewpoint that formation of a zeolite having a backbone different from the GIS-type backbone can be suppressed.

The temperature in the hydrothermal synthesis may be constant or may be changed stepwise.

The period for the hydrothermal synthesis is not particularly limited as long as it is a period commonly used, and can be appropriately selected depending on the temperature in the hydrothermal synthesis.

The period for the hydrothermal synthesis is preferably 3 hours or more, more preferably 10 hours or more from the viewpoint that the GIS backbone is formed. The period is further preferably 24 hours or more from the viewpoint that a GIS-type zeolite high in crystallinity is obtained.

The period for the hydrothermal synthesis is preferably 30 days or less, more preferably 20 days or less, further preferably 10 days or less from the viewpoint of allowing the economic efficiency in zeolite production to be excellent.

The container to which the mixed gel is loaded in the hydrothermal synthesis step is not particularly limited as long as it is a container commonly used, and when the pressure in the container is increased at a predetermined temperature or is gas pressure not inhibiting crystallization, the mixed gel is preferably loaded in a pressure-resistant container and subjected to the hydrothermal synthesis.

The pressure-resistant container is not particularly limited, and a pressure-resistant container having any of various shapes such as spherical, longitudinally elongated, and horizontally elongated shapes can be used.

When the mixed gel in the pressure-resistant container is stirred, the pressure-resistant container is rotated vertically and/or laterally, preferably rotated vertically.

When the pressure-resistant container is rotated vertically, the rotational speed is not particularly limited as long as it is within a range commonly used, and it is preferably 1 to 50 rpm, more preferably 10 to 40 rpm.

In the hydrothermal synthesis step, examples of preferable stirring of the mixed gel include a method including using a pressure-resistant container having a longitudinally elongated shape and vertically rotating it.

(Separation/Drying Step)

After the hydrothermal synthesis step, the solid as the product and the liquid including water are separated, and the separation method is not particularly limited as long as it is a common method. Filtration, decantation, a spray-drying method (rotary atomization, nozzle atomization, ultrasonic atomization or the like), a drying method using a rotary evaporator, a vacuum drying method, a freeze-drying method, a natural drying method, or the like can be used, and separation can be usually made by filtration or decantation.

The resultant from separation may be used as it is, or may be washed with water or a predetermined solvent. The resultant from separation can be, if necessary, dried.

The temperature at which the resultant from separation is dried is not particularly limited as long as it is a common drying temperature, and it is usually from room temperature to 150° C. or less.

The atmosphere during drying is not particularly limited as long as it is an atmosphere commonly used, and an air atmosphere, or an atmosphere to which an inert gas such as nitrogen or argon, or oxygen is added is usually used.

(Cation Exchange)

The GIS-type zeolite in the present embodiment can be subjected to cation exchange such that the above values of A and B satisfy a predetermined relationship. Such cation exchange is not particularly limited as long as it is a commonly known method, and examples include an ion exchange method and an impregnation supporting method. In such a procedure, without limitation to the following, for example, nitrate such as $NH_4NO_3$, $LiNO_3$, $NaNO_3$, $KNO_3$, $RbNO_3$, $CsNO_3$, $Be(NO_3)_2$, $Ca(NO_3)_2$, $Mg(NO_3)_2$, $Sr(NO_3)_2$, or $Ba(NO_3)_2$, or a salt where a nitrate ion included in the nitrate is changed to a halide ion, a sulfate ion, a carbonate ion, a hydrogen carbonate ion, an acetate ion, a phosphate ion or a hydrogen phosphate ion, or an acid such as nitric acid or hydrochloric acid can be used.

The cation exchange temperature is not particularly limited as long as it is a common cation exchange temperature, and it is usually from room temperature to 100° C. or less. In separation of zeolite after such cation exchange, the separation method is not particularly limited as long as it is a common method. Filtration, decantation, a spray-drying method (rotary atomization, nozzle atomization, ultrasonic atomization or the like), a drying method using a rotary evaporator, a vacuum drying method, a freeze-drying method, a natural drying method, or the like can be used, and separation can be usually made by filtration or decantation. The resultant from separation may be, if necessary, washed with water or a predetermined solvent, or dried. The temperature at which the resultant from separation is dried is not particularly limited as long as it is a common drying temperature, and it is usually from room temperature to 150° C. or less. The atmosphere during drying is not particularly limited as long as it is an atmosphere commonly used, and an air atmosphere, or an atmosphere to which an inert gas such as nitrogen or argon, or oxygen is added is usually used.

[Calcining Step]

For example, particularly when an organic structure-directing agent is used, a dried product obtained in the separation/drying step can be, if necessary, calcined, and thus the GIS-type zeolite can be obtained. The calcining temperature is not particularly limited as long as it is a temperature commonly used, and it is preferably 300° C. or more, more preferably 350° C. or more from the viewpoint that, when the organic structure-directing agent is desired to be removed, the proportion thereof remaining can be decreased. The temperature is further preferably 400° C. or more from the viewpoint that the calcining period is decreased to allow the economic efficiency in GIS-type zeolite production to be excellent.

The calcining temperature is preferably less than 550° C., more preferably 530° C. or less, further preferably 500° C. or less because crystallinity of the GIS-type zeolite tends to be retained.

The calcining period is not particularly limited as long as it is a period where the organic structure-directing agent is sufficiently removed, and it can be appropriately selected depending on the calcining temperature and is preferably 0.5 hours or more, more preferably 1 hour or more, further preferably 3 hours or more because the proportion of the remaining organic structure-directing agent tends to be able to be decreased.

The calcining period is preferably 20 days or less, more preferably 10 days or less, further preferably 7 days or less because crystallinity of the GIS-type zeolite tends to be retained.

The calcining atmosphere is not particularly limited as long as it is an atmosphere commonly used, and an air atmosphere, or an atmosphere to which an inert gas such as nitrogen or argon, or oxygen is added is usually used.
(Carrier)

The GIS-type zeolite formed body of the present embodiment includes a carrier from the viewpoint that excellent strength is secured. Examples of the carrier include, in addition to inorganic oxides such as alumina, silica, magnesia, zirconia, and titania, clay minerals such as bentonite and kaolin, and cement inorganic binders such as calcium silicate and calcium aluminate, and alumina, silica, magnesia, zirconia, and titania are preferable and silica and alumina are more preferable.

The content of the carrier is preferably 5 to 90% by mass, more preferably 8 to 80% by mass, further preferably 10 to 70% by mass based on 100% by mass of the GIS-type zeolite formed body. If the content of the carrier is increased, the formed body tends to be increased in strength, but tends to be decreased in content of zeolite itself. Thus, the content of the carrier is preferably adjusted in consideration of strength, performance, and the like required depending on the application.
(Shape)

The GIS-type zeolite formed body of the present embodiment may be a powder. Such a GIS-type zeolite formed body preferably has a particle size of 20 μm or more and 300 μm or less. The particle size is more preferably 20 μm or more and 200 μm or less, further preferably 30 μm or more and 100 μm or less. The GIS-type zeolite formed body, when is a powder, is suitable for use in a process using a fluid bed, and, when has the above particle size, tends to be more preferably applicable to the process.

The GIS-type zeolite formed body of the present embodiment, when is a powder, is preferably obtained through spray-drying treatment. The spray-drying treatment is described below.

The particle size can be measured based on a method described in Examples below, and can be adjusted within the above range by, for example, conditions of the spray-drying treatment.

The GIS-type zeolite formed body of the present embodiment may be a pellet. Such a GIS-type zeolite formed body is preferably a pellet of a size having a length of 3 mm or more and 50 mm or less and a diameter of 1 mm or more and 20 mm or less. The length of such a pellet may be 3 mm or more and 40 mm or less, 3 mm or more and 30 mm or less, 3 mm or more and 15 mm or less, 3 mm or more and 10 mm or less, or 3 mm or more and 8 mm or less. The diameter of such a pellet may be 2 mm or more and 10 mm or less, 2 mm or more and 5 mm or less, or 2 mm or more and 4 mm or less. The GIS-type zeolite formed body, when is a pellet, is suitable for use in a process using a fixed bed, and, when has the above length and diameter, tends to be more preferably applicable to the process.

The shape of such a pellet preferably satisfies the above length and diameter, and is not particularly limited and may be a cylindrical shape, a chamfered cylindrical shape, or a spherical shape. The chamfered cylindrical shape means a shape where the corners of the upper surface and the bottom surface of a cylindrical shape are circularly processed.

The GIS-type zeolite formed body of the present embodiment, when is a pellet, is preferably obtained through extrusion treatment. The extrusion treatment is described below.

The length and the diameter can be measured based on a method described in Examples below, and can be adjusted within the above ranges by, for example, an operation such as classification.

The compressive strength of the GIS-type zeolite formed body of the present embodiment is preferably 6.0 MPa or more, more preferably 6.2 MPa or more, further preferably 6.4 MPa or more. Particularly, when the GIS-type zeolite formed body of the present embodiment is a powder, the above range is preferably satisfied.

The compressive strength can be measured based on a method described in Examples below, and can be adjusted within the above range by, for example, the calcining temperature and the calcining period.

The fracture strength of the GIS-type zeolite formed body of the present embodiment is preferably 20 N or more, more preferably 22 N or more, further preferably 24 N or more. Particularly, when the GIS-type zeolite formed body of the present embodiment is a pellet, the above range is preferably satisfied.

The fracture strength can be measured based on a method described in Examples below, and can be adjusted within the above range by, for example, the calcining temperature and the calcining period.
[Method for Producing GIS-Type Zeolite Formed Body]

A method for producing the GIS-type zeolite formed body according to the present embodiment can include, but not particularly limited, a forming treatment step (X) of subjecting a starting material prepared by mixing the GIS-type zeolite in the present embodiment, the carrier, and other any component, to forming treatment, to obtain a precursor, and a calcining step (Y) of calcining the precursor to obtain the GIS-type zeolite formed body.

A commonly known method can be adopted in the forming treatment step (X) without any particular limitation, and examples thereof include spray-drying treatment, extrusion treatment, injection treatment, injection/casting treatment, rolling granulation treatment, and pressing treatment. Among them, forming by spray-drying treatment or extrusion treatment is preferable.

The temperature of a starting material (also referred to as "slurry" in spray-drying treatment.) slurry subjected to spray-drying treatment is not particularly limited, and is, for example, preferably 10° C. to 80° C., more preferably 15° C. to 60° C. When the temperature of the slurry is 80° C. or less, evaporation of water in the slurry tends to be able to be suppressed, and when the temperature of the slurry is 10° C. or more, freezing in the slurry tends to be able to be suppressed.

Any unit can be adopted as a stirring unit in preparation of the slurry, and examples thereof preferably include a stirring blade. Specific examples of the shape of the blade for use in stirring include a propeller shape, a paddle shape, a flat paddle shape, a turbine shape, and a cone shape. A baffle or the like may be disposed in a tank in order to perform efficient stirring. The number of stirrers may be selected as an optimal condition depending on the size of a liquid tank for a catalyst starting material, the shape of the stirring blade, and the like.

In the present embodiment, the total stirring time of the slurry is preferably 1 minute to 24 hours, more preferably 10 minutes to 5 hours, further preferably 15 minutes to 3 hours. When the stirring time of a mixed liquid is 1 minute or more, the composition in the slurry is easily uniform, and when the stirring time is 24 hours or less, the influence by evaporation of moisture in the slurry tends to be smaller.

The slurry can be atomized by a method to be usually industrially carried out, such as a rolling disc system, a two-fluid nozzle system and a high-pressure nozzle system, and is particularly preferably atomized by a rolling disc system.

A dry heat source used in drying of a droplet atomized is preferably air heated by steam, an electric heater, or the like. The temperature at the inlet of a dryer can be about 100° C. to 400° C., and is preferably 150° C. to 300° C. The temperature at the outlet of a dryer can be about 40° C. to 150° C., and is preferably 50° C. to 130° C.

The extrusion treatment is not particularly limited, and, for example, the temperature at which a starting material used (also referred to as "starting material clay" in the extrusion treatment.) is heated and concentrated is preferably 40° C. to 80° C., more preferably 50° C. to 75° C. When the temperature is 40° C. or more, a reduction in efficiency of heating and concentration tends to be able to be prevented, and when the temperature is 80° C. or less, an excessive increase in amount of moisture evaporated tends to be able to be prevented and control of a concentrated state tends to be facilitated.

The amount of moisture in the starting material clay is preferably 35% to 50%, more preferably 38% to 45%. When the amount of moisture is 50% or less, the starting material clay can be prevented from being excessively enhanced in flexibility and tends to be enhanced in formability, and when the amount of moisture is 35% or more, the starting material clay can be prevented from being excessively deteriorated in flexibility and tends to be enhanced in formability.

The extruder used in the extrusion treatment is not particularly limited, and examples thereof include screw type, roll type, blade type, self-forming type, and ram type extruders. Among them, the extrusion treatment is preferably carried out particularly by a screw type extruder.

[Calcining Step (Y)]

The calcining temperature in the calcining step (Y) is not particularly limited as long as it is a temperature commonly used, and is preferably less than 550° C., more preferably 530° C. or less, further preferably 500° C. or less because strength tends to be able to be secured with crystallinity of zeolite being retained. The calcining temperature is preferably 110° C. or more, more preferably 120° C. or more.

The calcining period in the calcining step (Y) is not particularly limited as long as it is a period where the carrier is sufficiently dried and sintered, and it can be appropriately selected depending on the calcining temperature and the calcining period is preferably 20 days or less, more preferably 10 days or less, further preferably 7 days or less because strength tends to be able to be secured with crystallinity of zeolite being retained.

The calcining atmosphere in the calcining step (Y) is not particularly limited as long as it is an atmosphere commonly used, and an air atmosphere, or an atmosphere to which an inert gas such as nitrogen or argon, or oxygen is added is usually used.

The calcining in the calcining step (Y) can be performed with a calcining furnace such as a rotary furnace, a tunnel furnace, or a muffle furnace.

[Application]

The GIS-type zeolite formed body is not particularly limited in the application thereof, and can be used for, for example, separating agents or separation membranes for various gases and liquids, electrolyte membranes for fuel cells and the like, fillers of various resin molded articles, membrane reactors, catalysts for hydrocracking, alkylation and the like, catalyst carriers for carrying metals, metal oxides, and the like, adsorbing materials, desiccants, detergent aids, ion exchangers, waste water treatment agents, fertilizers, food additives, cosmetic additives, and the like.

Among the above, the GIS-type zeolite formed body of the present embodiment can be suitably used as an adsorbing material. That is, an adsorbing material of the present embodiment includes the GIS-type zeolite formed body of the present embodiment.

The GIS-type zeolite formed body of the present embodiment tends to be easily enhanced in selectivity of adsorption of carbon dioxide, and therefore the adsorbing material of the present embodiment can be designed as, for example, one which can sufficiently adsorb carbon dioxide and which is also high in selectivity of adsorption of carbon dioxide relative to the amount of adsorption of methane. In this case, the adsorbing material can be particularly preferably used for the purpose of, for example, selective removal of carbon dioxide from natural gas.

The adsorption apparatus of the present embodiment is not particularly limited in terms of the configuration thereof as long as it includes the GIS-type zeolite formed body of the present embodiment, and examples of a typical configuration include an example illustrated in FIG. 1. An adsorption apparatus 1 of the present embodiment, illustrated in FIG. 1, includes a filter 3 disposed at each of two positions closer to the inlet and the outlet in a container 2, and a plurality of zeolite particles 4 (the GIS-type zeolite formed body of the present embodiment) disposed between such two filters 3. For example, a filter formed from quartz can be used for the filter 3. For example, when the adsorption apparatus 1 is used for removal of carbon dioxide from natural gas, the natural gas can be introduced through an upper line and impurities can be removed therefrom by the filter 3, thereafter carbon dioxide is selectively adsorbed and removed by the zeolite particles 4, and a methane-rich gas can be taken out through a lower line. Herein, an object to be treated with the adsorption apparatus is not limited to natural gas, and the inner structure of the adsorption apparatus is also not limited to the example illustrated in FIG. 1.

[Separation Method]

A separation method of the present embodiment separates one or more selected from the group consisting of $CO_2$, $H_2O$, He, Ne, $Cl_2$, $NH_3$, and HCl from a mixture including two or more gases selected from the group consisting of $H_2$, $N_2$, CO, and hydrocarbon by use of an adsorption apparatus including the GIS-type zeolite formed body of the present embodiment. In the present embodiment, one or more selected from the group consisting of $CO_2$ and $H_2O$ are preferably separated from one or more gases selected from the group consisting of $N_2$, CO, and hydrocarbon. Herein, the hydrocarbon is not particularly limited, and examples thereof include methane, ethane, ethylene, propane, propylene, 1-butene, 2-butene, 2-methylpropene, dimethyl ether, and acetylene.

Such a separation method using the GIS-type zeolite formed body of the present embodiment is not particularly limited, and is preferably a method low in energy in reproduction of an adsorbing material, for example, the GIS-type zeolite formed body, and excellent in economic performance. A specific example of such a method here used is, but not particularly limited, preferably any of a pressure swing-type adsorption-separation method, a temperature swing-type adsorption-separation method, or a pressure/temperature swing-type adsorption-separation method. A pressure swing-type adsorption-separation method (PSA: Pressure Swing Adsorption) is a method where gas separation is performed by decreasing the pressure in gas desorption so that the pressure is lower than that in gas adsorption and utilizing the difference between the amount of adsorption at a high pressure and the amount of adsorption at a low pressure. A temperature swing-type adsorption-separation method (TSA: Thermal Swing Adsorption) is a method where gas separation is performed by increasing the temperature in gas desorption so that the temperature is higher than that in gas adsorption and utilizing the difference between the amount of adsorption at a low temperature and the amount of adsorption at a high temperature. A combined method of such methods is a pressure/temperature swing-type adsorption desorption method (PTSA: Pressure and Thermal Swing Adsorption). Such methods can be performed in various known conditions.

The above separation method can be carried out as a method for producing a purified gas. In other words, the method for producing a purified gas of the present embodiment separates one or more selected from the group consisting of $CO_2$, $H_2O$, He, Ne, $Cl_2$, $NH_3$, and HCl from a mixture including two or more gases selected from the group consisting of $H_2$, $N_2$, CO, and hydrocarbon by use of an adsorption apparatus including the GIS-type zeolite formed body of the present embodiment. For example, when methane and carbon dioxide are separated from mixed gas containing methane and carbon dioxide, by adsorption of carbon dioxide to the adsorbing material, the purified gas in the present embodiment may be methane or carbon dioxide. In other words, not only gas serving as an adsorbate of the adsorbing material of the present embodiment, but also other gas can be recovered as the purified gas in the present embodiment.

EXAMPLES

Hereinafter, the present embodiment will be described with reference to Examples and Comparative Examples, but the present embodiment is not intended to be limited to these examples at all.

[Crystal Structure Analysis]

Crystal structure analysis of GIS-type zeolite was performed according to the following procedure.

(1) A dried product (powdered zeolite) obtained in each of Synthesis Examples 1 and 2 was used as a sample, and pulverized by an agate mortar. A mixed product was used as a structure analysis sample, the product being obtained by further adding 10% by mass of crystalline silicon (produced by Rare Metallic Co., Ltd.) and mixing the resultant by an agate mortar until a homogeneous system was obtained.

(2) The sample in (1) above was uniformly secured on a non-reflective sample plate for powder, and crystal structure analysis was performed in the following conditions.

X-ray diffraction apparatus (XRD): powder X-ray diffraction apparatus "RINT2500 Model" (trade name) manufactured by Rigaku Corporation X-ray source: Cu tube (40 kV, 200 mA)

Measurement temperature: 25° C.

Measurement range: 5 to 60° (0.02°/step)

Measurement speed: 0.2°/min

Slit width (scattering, diffusion, light reception): 1°, 1°, 0.15 mm (3) The resulting X-ray diffraction spectrum was subjected to correction of displacement of 2θ by use of a diffraction peak of crystalline silicon and thereafter data analysis using an XRD data analysis software "PDXL2" (software name, manufactured by Rigaku Corporation) with the value set in the analysis software, "α-cut value", being 3.00, thereby determining the peak 2θ value.

[Measurement of Content of Each Element (Method for Measuring A, B, C and D)]

The GIS-type zeolite produced in each Synthesis Example and the GIS-type zeolite formed body produced in each of Examples and Comparative Examples were each thermally dissolved in an aqueous sodium hydroxide solution or aqua regia, and appropriately diluted to provide a liquid, and the liquid was used to perform composition analysis according to ICP-emission spectrochemical analysis (SPS3520UV-DD: apparatus name, manufactured by Seiko Instruments Inc.), and the alkali metal and alkaline earth metal contents were calculated and A, B, C and D were determined. The contents of Si, Al, P, Zr and Ti were also similarly calculated.

[Strength Measurement]

The strength of the GIS-type zeolite formed body was determined as the average value of the values obtained by measurement 20 times with a micro compression testing machine (MCT-W500 manufactured by Shimadzu Corporation, compressive strength measurement) in each of Examples 1 to 10 and 21 to 22, and Comparative Examples 1 to 6 and 13 to 14 or a digital hardness meter (KHT-40N manufactured by Fujiwara Scientific Co., Ltd., indenter 3 mm, fracture strength measurement) in each of Examples 11 to 20 and 23 to 24, and Comparative Examples 7 to 12 and 15 to 16.

[Particle Size Measurement]

The particle size of the GIS-type zeolite formed body in each of Examples 1 to 10, 21 to 22 and Comparative Example 1 to 6 and 13 to 14 was measured with a laser diffraction/scattering type particle size analyzer (MT3000 manufactured by MicrotracBEL Corp.), according to the attached manual.

[Measurement of Length and Diameter of Pellet]

The length and the diameter of a pellet with respect to each of the GIS-type zeolite formed bodies in Examples 11 to 20, 23 and 24, and Comparative Examples 7 to 12, 15 and 16 were measured by a caliper method. The measurement was performed for three samples by use of a caliper of a minimum read value of 0.1 mm or less, and the respective average values were adopted as the length and the diameter.

[Gas Adsorption Isotherm Measurement]

Gas adsorption isotherm measurement was performed according to the following procedure.

(1) Each of GIS-1 and a formed body obtained in each of Examples was used as a sample, and 0.2 g thereof was placed in a 12-mm cell (manufactured by Micromeritics Instrument Corporation).

(2) The sample placed in the cell of (1) above was mounted in a gas adsorption measuring apparatus "3-Flex" (trade name) manufactured by Micromeritics Instrument Corporation, and subjected to a degassing treatment with heating under vacuum at 250° C. and 0.001 mmHg or less for 12 hours.

(3) The sample placed in the cell after the treatment in (2) above was placed in constant-temperature circulating water at 25° C., and, after the sample temperature reached 25±0.2° C., measurement with liquefied carbon dioxide gas (produced by Sumitomo Seika Chemicals Co., Ltd., purity: 99.9% by mass or more), methane gas (produced by Sumitomo Seika Chemicals Co., Ltd., purity: 99.0% by mass or more) or nitrogen gas (produced by Taiyo Nippon Sanso Corporation, purity: 99.9995% by mass) was conducted with the absolute pressure being 0.25 up to 760 mmHg. Here, the pressure was measured over time during the measurement, and it was determined that the amount of saturation adsorption was achieved when the pressure variation reached 0.001%/10 sec or less.

[Synthesis of GIS-Type Zeolite]

Synthesis Example 1

207.30 g of water, 8.78 g of sodium hydroxide (NaOH, produced by Wako Pure Chemical Industries, Ltd.), 16.4 g of sodium aluminate (NaAlO$_2$, produced by Wako Pure Chemical Industries, Ltd.) and 248.3 g of liquid glass No. 3 (produced by Kishida Chemical Co., Ltd.) were mixed, and stirred for 15 minutes, thereby preparing a mixed gel. The composition of the mixed gel was as follows: SiO$_2$/Al$_2$O$_3$=12.0, Na$_2$O/Al$_2$O$_3$=4.0 and H$_2$O/Al$_2$O$_3$=200. The mixed gel was loaded to a 1000-mL stainless autoclave with a fluororesin inner cylinder placed, and was subjected to hydrothermal synthesis at 130° C. for 5 days without stirring, a product was subjected to filtration and dried at 120° C., and thereafter a powdered GIS-type zeolite was obtained. The GIS-type zeolite thus obtained, not to be subjected to any ion exchange treatment, was adopted as GIS-0, and used in production or the like of a formed body described below.

According to an XRD pattern obtained from the zeolite of Synthesis Example 1, a diffraction peak of (1 0 1) was exhibited at 12.40°, a diffraction peak of (2 1 1) was exhibited at 21.62°, and a diffraction peak of (3 1 2) was exhibited at 33.38°, and thus the resulting zeolite was confirmed to be a GIS-type zeolite.

The amount of Al included in the GIS-type zeolite of Synthesis Example 1 was 9.9% by mass, and P, Zr and Ti were not detected.

Synthesis Example 2

Zeolite as the zeolite corresponding to one described in Example 3 of Patent Literature 1 was synthesized as follows. In other words, 329.50 g of water, 1.76 g of sodium hydroxide, 3.28 g of sodium aluminate and 49.7 g of liquid glass No. 3 were mixed, and stirred for 6 hours, thereby preparing a mixed gel. The composition of the mixed gel was as follows: SiO$_2$/Al$_2$O$_3$=12.0, Na$_2$O/Al$_2$O$_3$=4.0 and H$_2$O/Al$_2$O$_3$=1000. The mixed gel was loaded to a 1000-mL stainless autoclave with a fluororesin inner cylinder placed, and was subjected to hydrothermal synthesis at 135° C. for 4 days without stirring, a product was subjected to filtration and dried at 120° C., and thereafter a powdered zeolite was obtained. 1 g of the resulting zeolite was placed in 500 mL of an aqueous 0.1 N potassium hydroxide solution, and stirred at 40° C. and 400 rpm for 3 hours. A product was subjected to filtration and dried at 120° C., and thereafter a powdered GIS-type zeolite where the cation was partially exchanged with potassium was obtained.

According to an XRD pattern obtained from the zeolite of Synthesis Example 2, a diffraction peak of (1 0 1) was exhibited at 12.78°, a diffraction peak of (2 1 1) was exhibited at 22.20°, and a diffraction peak of (3 1 2) was exhibited at 34.18°, and thus the resulting zeolite was confirmed to be a GIS-type zeolite.

The amount of Al included in the GIS-type zeolite of Synthesis Example 2 was 9.7% by mass, and P, Zr and Ti were not detected.

[Cation Exchange]

GIS-0 obtained in Synthesis Example 1 was subjected to cation exchange with potassium carbonate or lithium nitrate by an ion exchange method, and the ion concentration and the number of exchanges were adjusted, thereby providing GIS-1 to GIS-7.

The GIS-type zeolite in Synthesis Example 2, GIS-8, was subjected to cation exchange with potassium carbonate by an ion exchange method, and the ion concentration and the number of exchanges were adjusted, thereby providing GIS-9.

GIS-0 to GIS-9 were subjected to ICP-emission spectrochemical analysis. The resulting alkali metal and alkaline earth metal contents are shown in Table 1. Herein, 1.3 A and B in Table 1 each represented a value in 100 g of a sample.

TABLE 1

| | GIS-0 | GIS-1 | GIS-2 | GIS-3 | GIS-4 | GIS-5 | GIS-6 | GIS-7 | GIS-8 | GIS-9 |
|---|---|---|---|---|---|---|---|---|---|---|
| Na (% by mass) | 9.3386 | 0.4433 | 2.1084 | 1.0014 | 1.9604 | 0.1342 | 3.6888 | 3.9736 | 2.3192 | 0.4322 |
| K (% by mass) | 0 | 15.4657 | 11.9875 | 0 | 0 | 12.1481 | 9.5919 | 0 | 12.3793 | 15.4344 |
| Li (% by mass) | 0 | 0 | 0 | 2.5885 | 2.3068 | 0.6901 | 0 | 1.6767 | 0 | 0 |
| A | 0 | 0.395 | 0.307 | 0.373 | 0.332 | 0.410 | 0.245 | 0.242 | 0.317 | 0.395 |
| B | 0.406 | 0.415 | 0.398 | 0.416 | 0.418 | 0.416 | 0.406 | 0.414 | 0.417 | 0.414 |
| C | 0.406 | 0.415 | 0.398 | 0.416 | 0.418 | 0.416 | 0.406 | 0.414 | 0.417 | 0.414 |
| D | 0 | 0.395 | 0.307 | 0 | 0 | 0.311 | 0.245 | 0 | 0.317 | 0.395 |
| C/A | — | 1.050 | 1.297 | 1.115 | 1.258 | 1.015 | 1.655 | 1.714 | 1.316 | 1.049 |
| B/A | — | 1.050 | 1.297 | 1.115 | 1.258 | 1.015 | 1.655 | 1.714 | 1.316 | 1.049 |
| C/D | — | 1.050 | 1.297 | — | — | 1.338 | 1.657 | — | 1.315 | 1.048 |

[Symbols]

The meanings of symbols described hereinafter are as follows.

A: Total amount of substance of potassium and lithium based on total amount of alkali metal and alkaline earth metal B: Sum of respective products by multiplication of amounts of substance with valences of alkali metal and alkaline earth metal C: Total amount of substance of alkali metal D: Total amount of substance of potassium

Example 1

561.4 g of GIS-1 was dispersed in 571.9 g of ion exchange water, and thereafter added to 4423.8 g of ALUMINASOL (produced by Nissan Chemical Corporation, alumina content rate: 10.5% by mass), thereby providing a starting material slurry. The resulting starting material slurry was stirred at 25° C. for 1 hour. The starting material slurry exhibited a sol state, and had a viscosity of 300 cP (measured with a B-type viscometer manufactured by EKO Instruments Co., Ltd.). The starting material slurry was fed to a spray-drying machine (OC-16-model spray-dryer manufactured by Ohkawara Kakohki Co., Ltd.) where the fluid temperature at the inlet of the spray-drying machine was set to 230° C. and the fluid temperature at the outlet of the spray-drying machine was set to 120° C., and was spray-dried with a rolling disc system, thereby providing a dry powder. The resulting dry powder was calcined with an electric furnace under an air atmosphere at 350° C. for 24 hours.

The strength of the GIS-type zeolite formed body thus obtained was 8.2 MPa. A, B, C, D, and the like were calculated by measurement of the content of each of the above elements, and were shown in Table 2. Herein, A, B, C and D in Table 2 each represented a value in 100 g of a sample. Furthermore, the particle size of the formed body was 55 μm. The amount of the carrier and the amount of the GIS-type zeolite in the formed body were respectively 45% by mass and 55% by mass.

Example 2

A GIS-type zeolite formed body was obtained in the same manner as in Example 1 except that the GIS-type zeolite was G-2. The strength of the GIS-type zeolite formed body thus obtained was 7.5 MPa. A, B, C, D, and the like were calculated by measurement of the content of each of the above elements, and were shown in Table 2. Furthermore, the particle size of the formed body was 55 μm.

Example 3

A GIS-type zeolite formed body was obtained in the same manner as in Example 1 except that the GIS-type zeolite was G-3. The strength of the GIS-type zeolite formed body thus obtained was 8.3 MPa. A, B, C, D, and the like were calculated by measurement of the content of each of the above elements, and were shown in Table 2. Furthermore, the particle size of the formed body was 56 μm.

Example 4

A GIS-type zeolite formed body was obtained in the same manner as in Example 1 except that the GIS-type zeolite was G-4. The strength of the GIS-type zeolite formed body thus obtained was 7.3 MPa. A, B, C, D, and the like were calculated by measurement of the content of each of the above elements, and were shown in Table 2. Furthermore, the particle size of the formed body was 55 μm.

Example 5

A GIS-type zeolite formed body was obtained in the same manner as in Example 1 except that the GIS-type zeolite was G-5. The strength of the GIS-type zeolite formed body thus obtained was 8.4 MPa. A, B, C, D, and the like were calculated by measurement of the content of each of the above elements, and were shown in Table 2. Furthermore, the particle size of the formed body was 56 μm.

Comparative Example 1

A GIS-type zeolite formed body was obtained in the same manner as in Example 1 except that the GIS-type zeolite was G-0. The strength of the GIS-type zeolite formed body thus obtained was 3.2 MPa. A, B, C, D, and the like were calculated by measurement of the content of each of the above elements, and were shown in Table 2. Furthermore, the particle size of the formed body was 55 μm.

Comparative Example 2

A GIS-type zeolite formed body was obtained in the same manner as in Example 1 except that the GIS-type zeolite was G-6. The strength of the GIS-type zeolite formed body thus obtained was 4.0 MPa. A, B, C, D, and the like were calculated by measurement of the content of each of the above elements, and were shown in Table 2. Furthermore, the particle size of the formed body was 56 μm.

Comparative Example 3

A GIS-type zeolite formed body was obtained in the same manner as in Example 1 except that the GIS-type zeolite was G-7. The strength of the GIS-type zeolite formed body thus obtained was 3.8 MPa. A, B, C, D, and the like were calculated by measurement of the content of each of the above elements, and were shown in Table 2. Furthermore, the particle size of the formed body was 55 μm.

Example 6

A GIS-type zeolite formed body was obtained in the same manner as in Example 1 except that 4423.8 g of ALUMINASOL was changed to 1263.9 g of ion exchange water and 3159.9 g of silica sol (produced by Nalco Chemical Company, silica content rate: 14.7% by mass). The strength of the GIS-type zeolite formed body thus obtained was 8.0 MPa. A, B, C, D, and the like were calculated by measurement of the content of each of the above elements, and were shown in Table 2. Furthermore, the particle size of the formed body was 50 μm.

Example 7

A GIS-type zeolite formed body was obtained in the same manner as in Example 6 except that the GIS-type zeolite was G-2. The strength of the GIS-type zeolite formed body thus obtained was 6.5 MPa. A, B, C, D, and the like were calculated by measurement of the content of each of the above elements, and were shown in Table 2. Furthermore, the particle size of the formed body was 51 μm.

Example 8

A GIS-type zeolite formed body was obtained in the same manner as in Example 6 except that the GIS-type zeolite was G-3. The strength of the GIS-type zeolite formed body thus obtained was 7.9 MPa. A, B, C, D, and the like were calculated by measurement of the content of each of the above elements, and were shown in Table 2. Furthermore, the particle size of the formed body was 51 μm.

Example 9

A GIS-type zeolite formed body was obtained in the same manner as in Example 6 except that the GIS-type zeolite was G-4. The strength of the GIS-type zeolite formed body thus obtained was 6.4 MPa. A, B, C, D, and the like were calculated by measurement of the content of each of the above elements, and were shown in Table 2. Furthermore, the particle size of the formed body was 52 μm.

Example 10

A GIS-type zeolite formed body was obtained in the same manner as in Example 6 except that the GIS-type zeolite was G-5. The strength of the GIS-type zeolite formed body thus obtained was 8.0 MPa. A, B, C, D, and the like were calculated by measurement of the content of each of the above elements, and were shown in Table 2. Furthermore, the particle size of the formed body was 51 μm.

Comparative Example 4

A GIS-type zeolite formed body was obtained in the same manner as in Example 6 except that the GIS-type zeolite was G-0. The strength of the GIS-type zeolite formed body thus obtained was 3.4 MPa. A, B, C, D, and the like were calculated by measurement of the content of each of the above elements, and were shown in Table 2. Furthermore, the particle size of the formed body was 51 μm.

Comparative Example 5

A GIS-type zeolite formed body was obtained in the same manner as in Example 6 except that the GIS-type zeolite was G-6. The strength of the GIS-type zeolite formed body thus obtained was 4.2 MPa. A, B, C, D, and the like were calculated by measurement of the content of each of the above elements, and were shown in Table 2. Furthermore, the particle size of the formed body was 51 μm.

Comparative Example 6

A GIS-type zeolite formed body was obtained in the same manner as in Example 6 except that the GIS-type zeolite was G-7. The strength of the GIS-type zeolite formed body thus obtained was 3.8 MPa. A, B, C, D, and the like were calculated by measurement of the content of each of the above elements, and were shown in Table 2. Furthermore, the particle size of the formed body was 51 μm.

Example 11

After 100 g of GIS-1, 250 g of alumina sol (produced by Kawaken Fine Chemicals Co., Ltd., alumina content rate: 10% by mass) and 275 g of ion exchange water were stirred and mixed, the amount of moisture was adjusted to 40% by heating and concentrating at 70° C., thereby providing a starting material clay. The resulting starting material clay was formed into a pellet having a length of 5 mm and a diameter of 3 mm, with a wet extruding granulator (Multi-gran MG-55-model (dome die 40 rpm), hole diameter φ3 mm), thereby providing an extruded article. The resulting extruded article was calcined with an electric furnace under an air atmosphere at 350° C. for 3 hours.

The strength of the GIS-type zeolite formed body thus obtained was 30.3 N. A, B, C, D, and the like were calculated by measurement of the content of each of the above elements, and were shown in Table 2. The amount of the carrier and the amount of the GIS-type zeolite in the formed body were respectively 20% by mass and 80% by mass.

Example 12

A GIS-type zeolite formed body (pellet having a length of 5 mm and a diameter of 3 mm) was obtained in the same manner as in Example 11 except that the GIS-type zeolite was G-2. The strength of the GIS-type zeolite formed body thus obtained was 24.6 N. A, B, C, D, and the like were calculated by measurement of the content of each of the above elements, and were shown in Table 2.

Example 13

A GIS-type zeolite formed body (pellet having a length of 5 mm and a diameter of 3 mm) was obtained in the same manner as in Example 11 except that the GIS-type zeolite was G-3. The strength of the GIS-type zeolite formed body thus obtained was 30.6 N. A, B, C, D, and the like were calculated by measurement of the content of each of the above elements, and were shown in Table 2.

Example 14

A GIS-type zeolite formed body (pellet having a length of 5 mm and a diameter of 3 mm) was obtained in the same manner as in Example 11 except that the GIS-type zeolite was G-4. The strength of the GIS-type zeolite formed body thus obtained was 24.0 N. A, B, C, D, and the like were calculated by measurement of the content of each of the above elements, and were shown in Table 2.

Example 15

A GIS-type zeolite formed body (pellet having a length of 5 mm and a diameter of 3 mm) was obtained in the same manner as in Example 11 except that the GIS-type zeolite was G-5. The strength of the GIS-type zeolite formed body thus obtained was 29.7 N. A, B, C, D, and the like were calculated by measurement of the content of each of the above elements, and were shown in Table 2.

Comparative Example 7

A GIS-type zeolite formed body (pellet having a length of 5 mm and a diameter of 3 mm) was obtained in the same manner as in Example 11 except that the GIS-type zeolite was G-0. The strength of the GIS-type zeolite formed body thus obtained was 6.0 N. A, B, C, D, and the like were calculated by measurement of the content of each of the above elements, and were shown in Table 2.

Comparative Example 8

A GIS-type zeolite formed body (pellet having a length of 5 mm and a diameter of 3 mm) was obtained in the same manner as in Example 11 except that the GIS-type zeolite was G-6. The strength of the GIS-type zeolite formed body thus obtained was 13.2 N. A, B, C, D, and the like were calculated by measurement of the content of each of the above elements, and were shown in Table 2.

Comparative Example 9

A GIS-type zeolite formed body (pellet having a length of 5 mm and a diameter of 3 mm) was obtained in the same manner as in Example 11 except that the GIS-type zeolite was G-7. The strength of the GIS-type zeolite formed body thus obtained was 12.6 N. A, B, C, D, and the like were calculated by measurement of the content of each of the above elements, and were shown in Table 2.

Example 16

A GIS-type zeolite formed body (pellet having a length of 5 mm and a diameter of 3 mm) was obtained in the same manner as in Example 11 except that 250 g of alumina sol was changed to 176.4 g of ion exchange water and 73.5 g of silica sol (produced by Nalco Chemical Company, silica content rate: 34% by mass). The strength of the GIS-type zeolite formed body thus obtained was 30.0 N. A, B, C, D, and the like were calculated by measurement of the content of each of the above elements, and were shown in Table 2.

Example 17

A GIS-type zeolite formed body (pellet having a length of 5 mm and a diameter of 3 mm) was obtained in the same manner as in Example 16 except that the GIS-type zeolite was G-2. The strength of the GIS-type zeolite formed body thus obtained was 24.6 N. A, B, C, D, and the like were calculated by measurement of the content of each of the above elements, and were shown in Table 2.

Example 18

A GIS-type zeolite formed body (pellet having a length of 5 mm and a diameter of 3 mm) was obtained in the same manner as in Example 16 except that the GIS-type zeolite was G-3. The strength of the GIS-type zeolite formed body thus obtained was 29.4 N. A, B, C, D, and the like were calculated by measurement of the content of each of the above elements, and were shown in Table 2.

Example 19

A GIS-type zeolite formed body (pellet having a length of 5 mm and a diameter of 3 mm) was obtained in the same manner as in Example 16 except that the GIS-type zeolite was G-4. The strength of the GIS-type zeolite formed body thus obtained was 24.3 N. A, B, C, D, and the like were calculated by measurement of the content of each of the above elements, and were shown in Table 2.

Example 20

A GIS-type zeolite formed body was obtained in the same manner as in Example 16 except that the GIS-type zeolite was G-5. The strength of the GIS-type zeolite formed body thus obtained was 28.5 N. A, B, C, D, and the like were calculated by measurement of the content of each of the above elements, and were shown in Table 2.

Comparative Example 10

A GIS-type zeolite formed body (pellet having a length of 5 mm and a diameter of 3 mm) was obtained in the same manner as in Example 16 except that the GIS-type zeolite was G-0. The strength of the GIS-type zeolite formed body thus obtained was 5.4 N. A, B, C, D, and the like were calculated by measurement of the content of each of the above elements, and were shown in Table 2.

Comparative Example 11

A GIS-type zeolite formed body was obtained in the same manner as in Example 16 except that the GIS-type zeolite was G-6. The strength of the GIS-type zeolite formed body thus obtained was 12.6 N. A, B, C, D, and the like were calculated by measurement of the content of each of the above elements, and were shown in Table 2.

Comparative Example 12

A GIS-type zeolite formed body (pellet having a length of 5 mm and a diameter of 3 mm) was obtained in the same manner as in Example 16 except that the GIS-type zeolite was G-7. The strength of the GIS-type zeolite formed body thus obtained was 12.0 N. A, B, C, D, and the like were calculated by measurement of the content of each of the above elements, and were shown in Table 2.

Example 21

A GIS-type zeolite formed body was obtained in the same manner as in Example 1 except that the GIS-type zeolite was G-9. The strength of the GIS-type zeolite formed body thus obtained was 8.0 MPa. A, B, C, D, and the like were calculated by measurement of the content of each of the above elements, and were shown in Table 2. Furthermore, the particle size of the formed body was 55 μm.

Example 22

A GIS-type zeolite formed body was obtained in the same manner as in Example 6 except that the GIS-type zeolite was G-9. The strength of the GIS-type zeolite formed body thus obtained was 7.8 MPa. A, B, C, D, and the like were calculated by measurement of the content of each of the above elements, and were shown in Table 2. Furthermore, the particle size of the formed body was 51 μm.

Example 23

A GIS-type zeolite formed body (pellet having a length of 5 mm and a diameter of 3 mm) was obtained in the same manner as in Example 11 except that the GIS-type zeolite was G-9. The strength of the GIS-type zeolite formed body thus obtained was 29.4 N. A, B, C, D, and the like were calculated by measurement of the content of each of the above elements, and were shown in Table 2.

Example 24

A GIS-type zeolite formed body (pellet having a length of 5 mm and a diameter of 3 mm) was obtained in the same manner as in Example 16 except that the GIS-type zeolite was G-9. The strength of the GIS-type zeolite formed body thus obtained was 28.2 N. A, B, C, D, and the like were calculated by measurement of the content of each of the above elements, and were shown in Table 2.

Comparative Example 13

A GIS-type zeolite formed body was obtained in the same manner as in Example 1 except that the GIS-type zeolite was G-8. The strength of the GIS-type zeolite formed body thus obtained was 5.8 MPa. A, B, C, D, and the like were calculated by measurement of the content of each of the above elements, and were shown in Table 2. Furthermore, the particle size of the formed body was 54 μm.

Comparative Example 14

A GIS-type zeolite formed body was obtained in the same manner as in Example 6 except that the GIS-type zeolite was G-8. The strength of the GIS-type zeolite formed body thus obtained was 5.3 MPa. A, B, C, D, and the like were calculated by measurement of the content of each of the above elements, and were shown in Table 2. Furthermore, the particle size of the formed body was 50 μm.

Comparative Example 15

A GIS-type zeolite formed body (pellet having a length of 5 mm and a diameter of 3 mm) was obtained in the same manner as in Example 11 except that the GIS-type zeolite was G-8. The strength of the GIS-type zeolite formed body thus obtained was 17.4 N. A, B, C, D, and the like were calculated by measurement of the content of each of the above elements, and were shown in Table 2.

Comparative Example 16

A GIS-type zeolite formed body (pellet having a length of 5 mm and a diameter of 3 mm) was obtained in the same manner as in Example 16 except that the GIS-type zeolite was G-8. The strength of the GIS-type zeolite formed body thus obtained was 16.8 N. A, B, C, D, and the like were calculated by measurement of the content of each of the above elements, and were shown in Table 2.

TABLE 2

| | Zeolite | A | B | C | D | B/A | C/A | C/D | Strength (MPa) | Strength (N) |
|---|---|---|---|---|---|---|---|---|---|---|
| Example 1 | GIS-1 | 0.216 | 0.228 | 0.228 | 0.216 | 1.055 | 1.055 | 1.055 | 8.2 | — |
| Example 2 | GIS-2 | 0.169 | 0.219 | 0.219 | 0.169 | 1.294 | 1.294 | 1.294 | 7.5 | — |
| Example 3 | GIS-3 | 0.205 | 0.229 | 0.229 | 0.000 | 1.117 | 1.117 | — | 8.3 | — |
| Example 4 | GIS-4 | 0.183 | 0.230 | 0.230 | 0.000 | 1.258 | 1.258 | — | 7.3 | — |
| Example 5 | GIS-5 | 0.225 | 0.229 | 0.229 | 0.171 | 1.016 | 1.016 | 1.341 | 8.4 | — |
| Example 6 | GIS-1 | 0.218 | 0.228 | 0.228 | 0.218 | 1.044 | 1.044 | 1.044 | 8.0 | — |
| Example 7 | GIS-2 | 0.169 | 0.219 | 0.219 | 0.169 | 1.294 | 1.294 | 1.294 | 6.5 | — |
| Example 8 | GIS-3 | 0.205 | 0.229 | 0.229 | 0.000 | 1.115 | 1.115 | — | 7.9 | — |
| Example 9 | GIS-4 | 0.183 | 0.231 | 0.231 | 0.000 | 1.262 | 1.262 | — | 6.4 | — |
| Example 10 | GIS-5 | 0.225 | 0.229 | 0.229 | 0.171 | 1.016 | 1.016 | 1.341 | 8.0 | — |
| Example 11 | GIS-1 | 0.316 | 0.332 | 0.332 | 0.316 | 1.050 | 1.050 | 1.050 | — | 30.3 |
| Example 12 | GIS-2 | 0.246 | 0.318 | 0.318 | 0.246 | 1.292 | 1.292 | 1.292 | — | 24.6 |
| Example 13 | GIS-3 | 0.298 | 0.333 | 0.333 | 0.000 | 1.116 | 1.116 | — | — | 30.6 |
| Example 14 | GIS-4 | 0.266 | 0.334 | 0.334 | 0.000 | 1.255 | 1.255 | — | — | 24.0 |
| Example 15 | GIS-5 | 0.328 | 0.333 | 0.333 | 0.248 | 1.016 | 1.016 | 1.341 | — | 29.7 |
| Example 16 | GIS-1 | 0.317 | 0.331 | 0.331 | 0.317 | 1.044 | 1.044 | 1.044 | — | 30.0 |
| Example 17 | GIS-2 | 0.246 | 0.318 | 0.318 | 0.246 | 1.292 | 1.292 | 1.292 | — | 24.6 |
| Example 18 | GIS-3 | 0.298 | 0.333 | 0.333 | 0.000 | 1.116 | 1.116 | — | — | 29.4 |
| Example 19 | GIS-4 | 0.267 | 0.335 | 0.335 | 0.000 | 1.255 | 1.255 | — | — | 24.3 |
| Example 20 | GIS-5 | 0.328 | 0.332 | 0.332 | 0.248 | 1.012 | 1.012 | 1.336 | — | 28.5 |
| Example 21 | GIS-9 | 0.217 | 0.227 | 0.227 | 0.217 | 1.046 | 1.046 | 1.046 | 8.0 | — |
| Example 22 | GIS-9 | 0.218 | 0.227 | 0.227 | 0.218 | 1.043 | 1.043 | 1.043 | 7.8 | — |
| Example 23 | GIS-9 | 0.315 | 0.331 | 0.331 | 0.315 | 1.050 | 1.050 | 1.050 | — | 29.4 |
| Example 24 | GIS-9 | 0.315 | 0.330 | 0.330 | 0.315 | 1.046 | 1.046 | 1.046 | — | 28.2 |
| Comparative Example 1 | GIS-0 | 0.000 | 0.223 | 0.223 | 0.000 | — | — | — | 3.2 | — |
| Comparative Example 2 | GIS-6 | 0.135 | 0.223 | 0.223 | 0.135 | 1.647 | 1.647 | 1.647 | 4.0 | — |
| Comparative Example 3 | GIS-7 | 0.133 | 0.228 | 0.228 | 0.000 | 1.713 | 1.713 | — | 3.8 | — |
| Comparative Example 4 | GIS-0 | 0.000 | 0.223 | 0.223 | 0.000 | — | — | — | 3.4 | — |
| Comparative Example 5 | GIS-6 | 0.135 | 0.223 | 0.223 | 0.135 | 1.647 | 1.647 | 1.647 | 4.2 | — |
| Comparative Example 6 | GIS-7 | 0.132 | 0.228 | 0.228 | 0.000 | 1.723 | 1.723 | — | 3.8 | — |
| Comparative Example 7 | GIS-0 | 0.000 | 0.325 | 0.325 | 0.000 | — | — | — | — | 6.0 |
| Comparative Example 8 | GIS-6 | 0.196 | 0.324 | 0.324 | 0.196 | 1.652 | 1.652 | 1.652 | — | 13.2 |
| Comparative Example 9 | GIS-7 | 0.194 | 0.331 | 0.331 | 0.000 | 1.708 | 1.708 | — | — | 12.6 |
| Comparative Example 10 | GIS-0 | 0.000 | 0.326 | 0.326 | 0.000 | — | — | — | — | 5.4 |
| Comparative Example 11 | GIS-6 | 0.196 | 0.324 | 0.324 | 0.196 | 1.652 | 1.652 | 1.652 | — | 12.6 |
| Comparative Example 12 | GIS-7 | 0.193 | 0.331 | 0.331 | 0.000 | 1.714 | 1.714 | — | — | 12.0 |
| Comparative Example 13 | GIS-8 | 0.174 | 0.230 | 0.230 | 0.174 | 1.323 | 1.323 | 1.323 | 5.8 | — |

TABLE 2-continued

| | Zeolite | A | B | C | D | B/A | C/A | C/D | Strength (MPa) | Strength (N) |
|---|---|---|---|---|---|---|---|---|---|---|
| Comparative Example 14 | GIS-8 | 0.175 | 0.230 | 0.230 | 0.175 | 1.317 | 1.317 | 1.317 | 5.3 | — |
| Comparative Example 15 | GIS-8 | 0.254 | 0.334 | 0.334 | 0.254 | 1.316 | 1.316 | 1.316 | — | 17.4 |
| Comparative Example 16 | GIS-8 | 0.253 | 0.334 | 0.334 | 0.253 | 1.320 | 1.320 | 1.320 | — | 16.8 |

Example 25

The adsorption isotherm of $CO_2$, $CH_4$ and $N_2$ into the GIS-type zeolite formed body in Example 1 was measured, and thus the respective amounts of adsorption at 25° C. and 760 mmHg were as follows: $CO_2$: 29.3 $cm^3$/g, $CH_4$: 0.1 $cm^3$/g, and $N_2$: 0.2 $cm^3$/g; and the adsorption selection rate ($CO_2$/$CH_4$) was 293 and the adsorption selection rate ($CO_2$/$N_2$) was 147 and the GIS-type zeolite formed body was confirmed to have sufficient performance of an adsorbing material.

The invention claimed is:

1. A GIS-type zeolite formed body, comprising
a GIS-type zeolite, and
a carrier,
wherein, when a total number of moles of substance of potassium and lithium is defined as A and a total number of moles of substance of an alkali metal is defined as C, C/A≤1.30 is satisfied, and
wherein 1.00<C/A is satisfied.

2. The GIS-type zeolite formed body according to claim 1, wherein, when a total number of moles of substance of potassium and lithium is defined as A, and a sum of respective products by multiplication of number of moles of substance with valences of an alkali metal and an alkaline earth metal is defined as B, B/A≤1.30 is satisfied.

3. The GIS-type zeolite formed body according to claim 1, wherein, when a total number of moles of substance of potassium is defined as D and a total number of moles of substance of an alkali metal is defined as C, C/D≤1.30 is satisfied.

4. The GIS-type zeolite formed body according to claim 2, wherein 1.00<B/A is satisfied.

5. The GIS-type zeolite formed body according to claim 3, wherein 1.00<C/D is satisfied.

6. The GIS-type zeolite formed body according to claim 1, wherein the carrier comprises one or more selected from the group consisting of silica and alumina.

7. The GIS-type zeolite formed body according to claim 1, wherein the GIS-type zeolite formed body has a particle size of 20 μm or more and 300 μm or less.

8. The GIS-type zeolite formed body according to claim 7, wherein the GIS-type zeolite formed body is obtained through spray-drying treatment.

9. The GIS-type zeolite formed body according to claim 7, wherein the GIS-type zeolite formed body has a compressive strength of 6.0 MPa or more.

10. The GIS-type zeolite formed body according to claim 1, wherein the GIS-type zeolite formed body is a pellet having a length of 3 mm or more and 50 mm or less and a diameter of 1 mm or more and 20 mm or less.

11. The GIS-type zeolite formed body according to claim 10, wherein the GIS-type zeolite formed body is obtained through extrusion treatment.

12. The GIS-type zeolite formed body according to claim 10, wherein the GIS-type zeolite formed body has a fracture strength of 20 N or more.

13. An adsorption apparatus comprising the GIS-type zeolite formed body according to claim 1.

14. A separation method comprising separating one or more selected from the group consisting of $CO_2$, $H_2O$, He, Ne, $Cl_2$, $NH_3$, and HCl from a mixture comprising two or more gases selected from the group consisting of $H_2$, $N_2$, CO, and hydrocarbon by use of the adsorption apparatus according to claim 13.

15. The separation method according to claim 14, wherein the gas separation is performed by a pressure swing-type adsorption-separation method, a temperature swing-type adsorption-separation method, or a pressure/temperature swing-type adsorption-separation method.

16. A method for producing a purified gas, comprising separating one or more selected from the group consisting of $CO_2$, $H_2O$, He, Ne, $Cl_2$, $NH_3$, and HCl from a mixture comprising two or more gases selected from the group consisting of $H_2$, $N_2$, CO, and hydrocarbon by use of the adsorption apparatus according to claim 13.

17. A GIS-type zeolite, wherein, when a total number of moles of substance of potassium is defined as D and a total amount number of moles of substance of an alkali metal is defined as C, C/D≤1.30 is satisfied, wherein a total number of moles of potassium and lithium is defined as A and a total number of moles of substance of an alkali metal is defined as C, 1.00<C/A≤1.30 is satisfied.

18. The GIS-type zeolite formed body according to claim 1, which is in powder form.

19. The GIS-type zeolite formed body according to claim 7, which is in powder form.

* * * * *